United States Patent
Conikee et al.

(10) Patent No.: US 10,956,574 B2
(45) Date of Patent: Mar. 23, 2021

(54) SYSTEM AND METHOD FOR SECURING APPLICATIONS THROUGH AN APPLICATION-AWARE RUNTIME AGENT

(71) Applicant: ShiftLeft Inc., Santa Clara, CA (US)

(72) Inventors: Chetan Conikee, Santa Clara, CA (US); Manish Gupta, San Jose, CA (US); Vlad A Ionescu, Menlo Park, CA (US); Ignacio del Valle Alles, Asturias (ES)

(73) Assignee: ShiftLeft Inc., Santa Clara, CA (US)

( * ) Notice: Subject to any disclaimer, the term of this patent is extended or adjusted under 35 U.S.C. 154(b) by 85 days.

(21) Appl. No.: 16/154,151

(22) Filed: Oct. 8, 2018

(65) Prior Publication Data

US 2019/0108342 A1 Apr. 11, 2019

Related U.S. Application Data

(60) Provisional application No. 62/569,524, filed on Oct. 7, 2017.

(51) Int. Cl.
*G06F 21/57* (2013.01)
*G06F 21/56* (2013.01)
(Continued)

(52) U.S. Cl.
CPC .......... *G06F 21/566* (2013.01); *G06F 21/554* (2013.01); *G06F 21/577* (2013.01); *H04L 63/20* (2013.01); *H04L 63/1416* (2013.01)

(58) Field of Classification Search
CPC ........ G06F 21/577; G06F 21/563; G06F 8/51; G06F 8/41; G06F 2221/033
See application file for complete search history.

(56) References Cited

U.S. PATENT DOCUMENTS 9,280,442 B1 3/2016 Nicolo
9,658,835 B1 5/2017 Venkataramani
(Continued)

FOREIGN PATENT DOCUMENTS

CN 100461132 C 2/2009

OTHER PUBLICATIONS

Yamaguchi, Fabian, "Modeling and Discovering Vulnerabilities with Code Property Graphs", University of Gottingen, Germany, Qualcomm Research Germany, Feb. 2, 2015, "https://www.researchgate.net/publication/263658395_Modeling_and_Discovering_Vulnerabilities_with_Code_Property_Graphs".

*Primary Examiner* — Ellen Tran
(74) *Attorney, Agent, or Firm* — Alpine Patents LLC; Brian Van Osdol

(57) ABSTRACT

A system and method for securing an application through an application-aware runtime agent can include: acquiring a code profile, instrumenting the application with a runtime agent according to the code profile, enforcing the runtime agent on the execution of the application, and responding to the runtime agent. Enforcing the runtime agent on the execution of the application can include monitoring the execution flow, which comprises of monitoring the utilization of the controls through the execution of the application; detecting a threat, which comprises identifying a section of the execution flow as a potential security threat; and regulating the execution flow to prevent or ameliorate the security threat. Responding to the runtime agent can include responding to the security threat and providing a user interface that may output runtime agent diagnostics and trigger alerts.

19 Claims, 10 Drawing Sheets

(51) Int. Cl.
   *H04L 29/06*    (2006.01)
   *G06F 21/55*    (2013.01)

(56) References Cited

U.S. PATENT DOCUMENTS

| | | | |
|---|---|---|---|
| 10,515,212 B1 | 12/2019 | McClintock et al. | |
| 2007/0240138 A1* | 10/2007 | Chess | G06F 11/3612 |
| | | | 717/143 |
| 2008/0256518 A1 | 10/2008 | Aoshima et al. | |
| 2009/0307664 A1 | 12/2009 | Huuck et al. | |
| 2010/0017868 A1* | 1/2010 | Hao | H04L 67/2819 |
| | | | 726/11 |
| 2010/0083240 A1 | 4/2010 | Siman | |
| 2010/0192220 A1 | 7/2010 | Heizmann et al. | |
| 2011/0083190 A1 | 4/2011 | Brown et al. | |
| 2012/0102474 A1* | 4/2012 | Artzi | G06F 21/577 |
| | | | 717/157 |
| 2013/0160130 A1 | 6/2013 | Mendelev et al. | |
| 2014/0019490 A1 | 1/2014 | Roy et al. | |
| 2014/0143827 A1 | 5/2014 | Edery et al. | |
| 2014/0282853 A1 | 9/2014 | Velammal et al. | |
| 2016/0224790 A1 | 8/2016 | Gupta | |
| 2016/0352769 A1 | 12/2016 | Bryant et al. | |
| 2017/0063910 A1 | 3/2017 | Muddu et al. | |
| 2017/0091470 A1 | 3/2017 | Infante-Lopez | |
| 2017/0206082 A1 | 7/2017 | Abadi et al. | |
| 2017/0316202 A1* | 11/2017 | Roichman | G06F 21/577 |
| 2018/0349614 A1 | 12/2018 | Ionescu et al. | |
| 2019/0005163 A1 | 1/2019 | Farrell et al. | |

\* cited by examiner

SYSTEM AND METHOD FOR SECURING APPLICATIONS THROUGH AN APPLICATION-AWARE RUNTIME AGENT

CROSS-REFERENCE TO RELATED APPLICATIONS

This application claims the benefit of U.S. Provisional Application No. 62/569,524, filed on 7 Oct. 2017, both of which is incorporated in its entirety by this reference.

TECHNICAL FIELD

This invention relates generally to the field of application security, and more specifically to a new and useful system and method for securing applications through an application-aware runtime agent.

BACKGROUND

Security of applications is an ever-increasing challenge for our modern world. Software vulnerabilities, exploits, and attacks are serious threats to businesses and individuals as more and more operations depend on these software applications.

Securing an application can be challenging however. Many solutions introduce performance problems and/or introduce bottlenecks in the development process. With modern development processes where code is frequently pushed to production, such solutions fail to keep pace. Another challenge is that operators of the applications are often removed from the development process and lack an easy way to interpreting events in a live application. Thus, there is a need in the application security field to create a new and useful system and method for securing applications through an application-aware runtime agent. This invention provides such a new and useful system and method.

DESCRIPTION OF THE EMBODIMENTS

Figure 1:
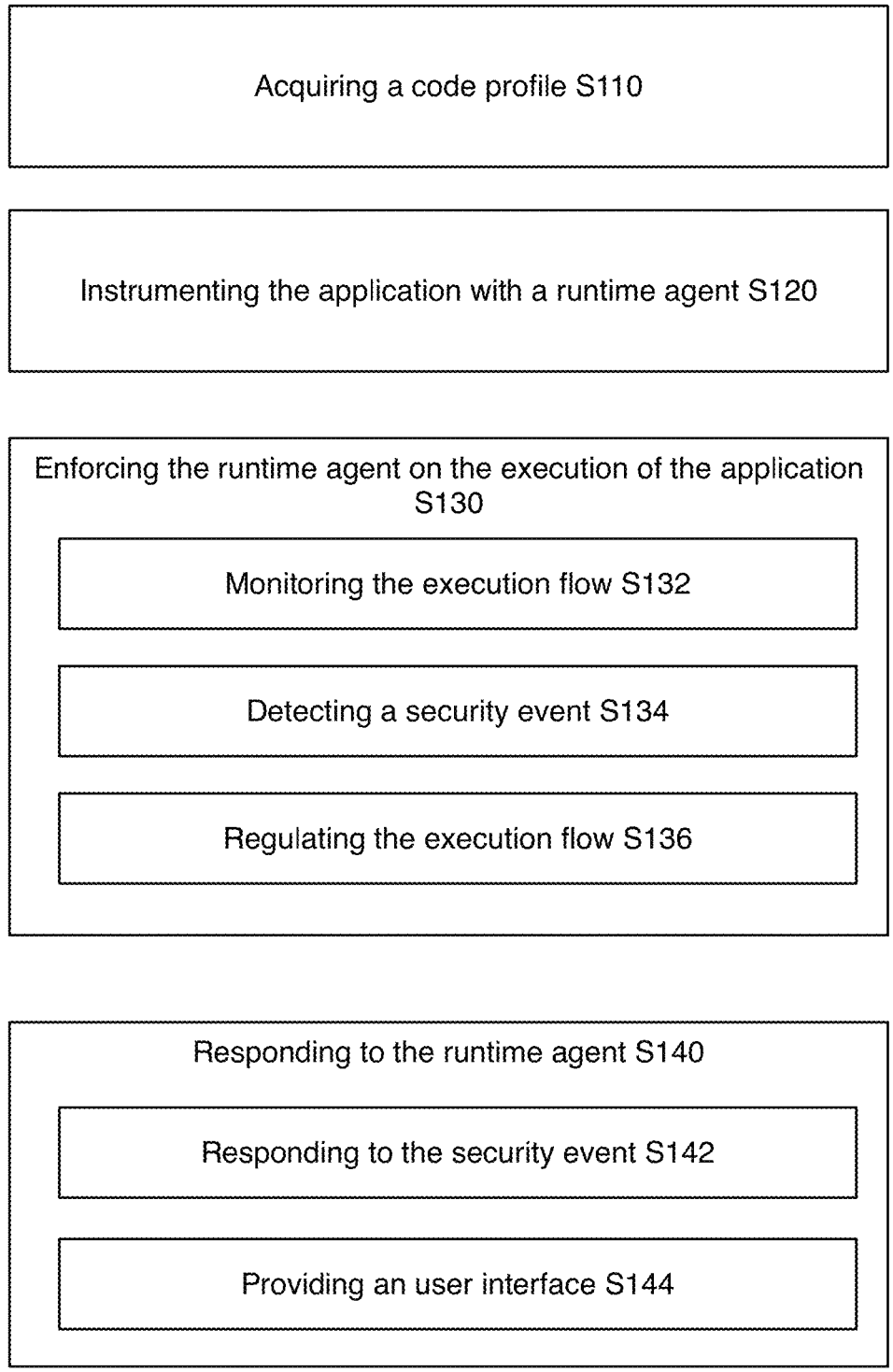
FIG. 1 is a flowchart representation of a method of a preferred embodiment.

The following description of the embodiments of the invention is not intended to limit the invention to these embodiments but rather to enable a person skilled in the art to make and use this invention.

Overview

A system and method for securing applications through an application-aware runtime agent functions to use interpretation of application code in partially defining approaches to monitoring and/or enforcing policy on the application during active use.

The system and method preferably rely on a code profile that is at least partially derived from application code. In particular, the code profile includes a code property graph that defines the application as a number of graphs that define behavior of the underlying code. The code profile and a security profile dictionary are preferably leveraged during operation of the application to selectively direct a runtime agent to monitor and enforce policy to secure an application-specific set of attack vectors. In particular, the system and method enable a runtime agent that is particularly targeted to securing the execution of an application based on underlying code as characterized by a code profile.

The system and method is preferably implemented in connection with a multi-tenant cloud-hosted platform that facilitates use of instantiations of the system and method with applications from various sources. Distinct application developers and administrators can use the system and method that both rely on the cloud-hosted platform. Additionally, distinct application developers and administrators may use the system and method individually or in concert. In particular, the platform can offer a web-based dashboard (accessible over the web, an application, and/or an API) to see and manage details for different customer applications. The system and method may alternatively be implemented as a single tenant solution, wherein a code profile and/or runtime agent are instantiated and managed for a single application without reliance of an outside platform. For example, a system could locally generate a code profile and then instrument the application with a corresponding runtime agent.

As one potential benefit, the system and method may enable application performance monitoring integrated with security monitoring such that administrators can understand performance, usage, and other activities from a security perspective.

As another potential benefit, the system and method may leverage code analysis in combination with runtime behavior detection to achieve higher precision analysis results. Assumptions based on code analysis can then be checked and validated during runtime, which may be used to specify uncertainty in the code analysis results but then achieve higher certainty by validating conditions in runtime.

As another potential benefit, the system and method may facilitate enhanced monitoring and awareness of an application. Administrators of an application can leverage the system and method to obtain high-level summaries of activity as it relates to security and to achieve detailed inspection of particular types of activity. As an example of high level monitoring of an application, metrics on inputs, outputs, datatype events, and/or potential issues could be summarized at a top level of a dashboard. As an example of low level monitoring of the application, an administrator may run a query to inspect how particular pieces of personal identifying information of a user is passed and handled within the application.

As another potential benefit, the system and method may facilitate implementation of machine learning algorithms to automatically improve the applications. Output of metrics and testing of assumptions based on code analysis allow for iterative updates of the application. These iterative changes of the application with sufficient metric outputs may allow machine learning algorithms to independently improve an application.

As another potential benefit, the system and method may enable more customized securing of application. The system and method preferably use the code profile to monitor and secure the application in response how the application was designed. In working off of an underlying understanding and interpretation of application operations, the system and method can more effectively secure a limited attack surface. This may result in better security as well as enhanced performance. As it relates to performance, the system and method can enable a runtime to focus security protection to portions of execution susceptible to vulnerabilities. As a related potential benefit, the system and method can use application integration so as to mitigate the impact of the runtime agent on performance.

Method

As shown in FIG. 1, a method for securing an application through an application-aware runtime agent of preferred embodiment can include: acquiring a code profile S110, instrumenting the application with a runtime agent according to the code profile S120, enforcing the runtime agent on the execution of the application S130, and optionally responding to the runtime agent S140. The method functions to apply code analysis of S110 to instrumentation of application code and eventual enforcement in S130 and S140. In particular, enforcing the runtime agent on the execution of the application S130, preferably includes monitoring the execution flow S132, which comprises of monitoring utilization of application controls through the execution of the application; detecting a security event S134, which comprises identifying a section of the execution flow as a potential security threat; and regulating the execution flow S136 to prevent or ameliorate the security threat. Responding to the runtime agent may include responding to the threat S142 and providing a user interface S144.

Block S110, acquiring the code profile, may function to generate and/or access some form of code analysis of the application source code. Acquiring a code profile S110 is preferably accomplished with assistance of a code analysis engine that converts the source code of one or more code sources of the application into a code profile. The code profile may have any structure but may be substantially similar to the code profile described in U.S. patent application Ser. No. 15/994,076, filed on May 31, 2018, which is hereby incorporated in its entirety. The code profile may characterize one or more properties of the code defining operations of the application. The code profile preferably characterizes possible operation flows between: portions of the code, inputs and outputs of the application, type of data and handling of data, dependencies, and/or other properties of the code. Acquiring the code profile S110 may comprise of generating a code profile as a part of the method. Alternatively, acquiring a code profile S110 may comprise of being provided or given access to the code profile.

The code profile is preferably generated for a particular scope of code, i.e. a subset of the application source code. The code profile may alternatively be generated for the entire source code. In this manner a single application may have multiple code profiles that characterize different portions of the code that may or may not overlap with each other. For example, different classes, modules, or libraries implemented by an application may have their own code profiles. A nested hierarchy of code profiles can enable someone to see how parts of a code base impact a higher order code profile. Additionally, an application may have multiple code profiles for different implementations. A code profile for "day-use" of the application may be different and characterize different parts of the application as compared to a code profile implemented by an application developer.

In some variations, an application that requires different libraries, modules, or portions of code may have individual code profiles used to generate multiple distinct runtime agents that are enforced on the corresponding portions of application code.

The code profile may function as a manifest interpretation of the components of the code that can have security and functional implications. The code profile can preferably be broken down into a set of application controls (herein referred to in brief as controls) that in combination may encapsulate the attack surface of the code, wherein the attack surface describes regions of source code that may introduce security vulnerabilities into the application. Patterns in various forms and sequences of application controls within the application execution are preferably used to detect a security event, where the application control is preferably derived at least in part from the code profile. Acquiring an application code profile can include mapping application controls of interest. Here, the application controls of interest may include method calls, data type activity, input and output calls, and/or other suitable types of application controls. In some variations, application controls of interest may be a defined sequence of application controls and/or a set of qualifying properties of application controls. Characterizing such patterns and interpreting which controls are of significance within the code graph of a code profile may be part of mapping the application controls. Controls preferably include interface channels, data, interaction flows, dependencies, and API elements. Controls may be added or removed as seen necessary. In one example a code profile with a set of controls is provided for the application (e.g. for commonly used library or web applications). In another example a user chooses a set of controls and then generates the code profile as part of the method (e.g. for user written code).

In preferred variations, interface channels are a subset of controls. Interface channels may function in characterizing input and output operations of the code base of the application. That is, interface channels may characterize all the data interaction with the outside world.

In preferred variations, interaction flows are also a subset of the controls. Each interaction flow may function in tracing a data interaction with the outside world characterizing the "flow" of interaction of the profiled components, such as the data and/or interface channels.

In preferred variations, dependencies are also a subset of the controls. Dependencies function as external libraries, web applications, functions, etc., that are necessary for the execution of the application.

In preferred variations, API elements are also a subset of the controls. API elements may function in representing exposed programmatic interfaces of the code base. API elements may be particularly applicable to a library, code module, or application that may expose programmatic interfaces for interaction by other parties. In a library, this can include the exposed function calls for user of the library.

In some preferred variations of the code profile, the set of controls are represented as a set of graphs that characterize operational relationships between the set of controls within the set of code sources. In preferred examples the set of controls are represented as a code property graph (CPG) as described in U.S. patent application Ser. No. 15/994,076, filed on May 31, 2018, which is hereby incorporated in its entirety. Alternatively, the set of controls may be represented using a different graph structure.

The CPG may function in representing operational relationships such that a flow (i.e. traversal of edges of the graph structure) can be traced through the code and its constituent frameworks and libraries. The CPG is preferably a joint data structure or model composed of an abstract syntax tree (AST) and a series of flow graphs. The AST and the series of flow graphs may each have nodes that exist for each statement and predicate of the source code. The statement and predicate nodes can serve as a connection point of the graphs when joining to form the CPG. Vulnerabilities and security impact of different events can be interpreted by inspecting the connection between these nodes.

The CPG preferably enables efficient processing and analysis of the codebase. The CPG is preferably a serializable data structure, which can enable efficient transmission and distribution of the code profile across various machines. Easy transmission can enable parallelized processing of the CPG, which can be leveraged in efficient traversal of the CPG in analysis of interaction flows between various points of interest in the codebase. The CPG can additionally be established for different segments of a codebase. For example, libraries and/or subcomponents of a codebase may each have a CPG.

An abstract syntax tree (AST) functions in characterizing structure and syntax of the code. A code parser can create an AST as an ordered tree where inner nodes represent operators and leaf nodes match operands.

Representing the set of controls as a set of flow graphs is preferably a component of acquiring a code profile S110. Representing the set of controls as a set of flow graphs functions in incorporating controls, and the flow of controls, into the code profile. In the preferred variation, wherein the set of controls includes interface channels, data, interaction flows, dependencies, and API elements; representing the set of controls as a set of flow graphs may comprise of generating a data flow graph and a control flow graph (as described in patent application Ser. No. 15/994,076, filed on May 31, 2018), wherein the data flow graph traces the flow of data and the control flow graph traces the flow of function/method calls. More preferably, representing the set of controls as a set of flow graphs may comprise converting the set of controls into a succession of method calls and then generating a set of flow graphs as per the control flow graphs. A sequence of method calls as indicated by a control flow graph may be used as a condition in detecting security events. Accordingly the runtime agent may use a control flow graph to determine which sequences of method calls to track. When methods execute in the right order that may signify a security event.

The control flow graph functions to characterize the functional flow of execution within code. The control flow graph can preferably represent sequential and/or possible sequences of execution. The control flow graph preferably characterizes the calls between functions in the code and/or the conditional branches within the code. For example, a statement preceding an if statement will have an association into the if statement or over the if statement within the control flow graph.

Acquiring the code analysis profile S110 may additionally include establishing assumptions on a set of implementations, which function to intelligently make predictions on aspects of the application that may not be readily apparent through just code analysis. The assumed set of implementations can later be validated and/or invalidated during runtime analysis. Establishing an assumption may include establishing instrumentation to monitor the possible implementations during runtime. Instrumentation that is invalidated may be later removed but could alternatively be left in place. As one example, an application may include code that calls a logger. The logger may be a programming language interface that does not contain the actual implementation but instead contains the API on how to call the implementation. A set of assumptions can be made on possible implementations that could be used with that logger interface. The set of possible implementations can be instrumented for runtime analysis. This can be implemented by communicating more flows than are actually possible in the code profile, but the actual flow implemented during runtime can be validated and reported. In some implementations, the validated assumptions may be saved so that future versions of the code profile can directly use the previously validated implementation. Validated implementations may be used over iterations to improve analysis and efficiency. In this manner machine learning and testing software may additionally be incorporated with this method.

Block S120, instrumenting the application with a runtime agent may function in enabling the runtime agent to track and monitor the execution flow, wherein the execution flow is the trace of the series of controls as they are utilized by the application at execution. Instrumenting the application with a runtime agent S120 may include integrating the runtime agent with the application and tagging flows of the control in accordance with the code profile.

Instrumenting the application with a runtime agent S120 preferably integrates the runtime agent with the execution of the application. The runtime agent preferably has different modes of operation during application execution: enforcing certain rules, monitoring the flow of the set of controls, detecting potential security threats, and reporting those occurrences.

Depending on the programming language, instrumenting the application with a runtime agent S120 may occur prior to, during, or after compilation of the source code. For example, precompiled languages (such as C) may incorporate the runtime agent prior to or during compilation, while a post compiled language (such as Java) may incorporate the runtime agent at the time of execution. In some preferred variations the runtime agent is written using a cross-platform programming language (e.g. Lua), enabling implementation of the runtime agent with applications written in multiple programming languages. In these variations instrumenting the application with a runtime agent S120 may include instrumenting the application with a language "agnostic" runtime agent. Alternatively, instrumenting the application with a runtime agent S120 may preferably include instrumenting the application with a language specific runtime agent. A language agnostic runtime agent may enable the use of a single runtime agent with a program that is written using multiple computer languages.

Within a Java-based application, an application can be modified to include a runtime agent that is added to a jar. This instrumentation preferably enables operation metering of that application process.

In C, C#, Golang, and other languages that do not use virtual machines, the runtime agent implementation may use an OS mechanism. For example, LD-preload can be used to insert agent functionality into attempts to access OS resources. The communication to the OS calls can be modified to track and/or modify actions. In kernel space, Berkeley Packet Filtering (BPF) may be used for security auditing of the runtime agent.

In one implementation, a compiler can be configured to compile application code to include jump statements or other suitable callout functionality to perform runtime agent specific operations in connection with particular events. Such statements are preferably added to method calls and can be used to track the sequence of method calls. In an alternative implementation, usable for Golang and possibly applicable to other languages, the instrumenting an application may add native instrumentation through trampolines wherein jump statements are inserted at the beginning or the end of methods. A compiler can be configured to insert no-op instructions, and later binary modification can then include replacing the no-op instructions with jump statements to instrumentation instructions. The instrumentation instructions are preferably configured to return execution flow to the location after the jump statement after completion.

Instrumenting of the runtime agent S120 may be specifically configured in accordance to the codebase of an application. The code profile may be converted to a runtime model of the code that can be used to instruct an agent on what aspects to instrument (monitor and/or regulate). Instrumenting the runtime agent S120 may include analyzing the code profile and thereby identifying a subset of controls vulnerable to potential security events. The entire execution of an application may not be instrumented, and instead a select portion of application code may be instrumented to particularly monitor that portion of execution. Controls identified or otherwise selected for instrumentation may be selected based on graph based connections to known vulnerability patterns. For example, controls that involve particular types of data (e.g., personally identifiable information) may be selected.

In addition to tracking and monitoring the flow of the set of controls, instrumenting the application with a runtime agent S120 may further enable tracking and monitoring of data associated with the set of controls. Preferably through tagging the execution flow, input data (i.e. payloads) may be analyzed and tracked through the execution flow at runtime. Tagging the execution flow functions to introspect how method executions go through the set of controls. For example, the execution flow of a sales transaction between an HTTP request to a database output may be inspected to see if the execution flow used an execution flow path that was or was not logged, as shown in FIG. 2A.

In one exemplary implementation of instrumentation, atomic compare and swap operations are executed during each control checkpoint (e.g., method call) and used in setting a flow counter. The atomic compare and swap operation is preferably a single instruction that can be used in implementing the flow counter mechanism to track execution paths. The state of some counter can be compared and selectively updated based on its value. Incorporating flow counters may be used in execution flow. In one variation, the program code is recompiled (if necessary) to insert these instructions. In another variation, bytecode from the program code can be modified to insert these instructions. These variations or other suitable forms of instrumentation may allow flow tracking with low overhead. Multiple flows can be tracked simultaneously in an efficient manner by devoting an array of flow counters in memory.

Figure 2A:
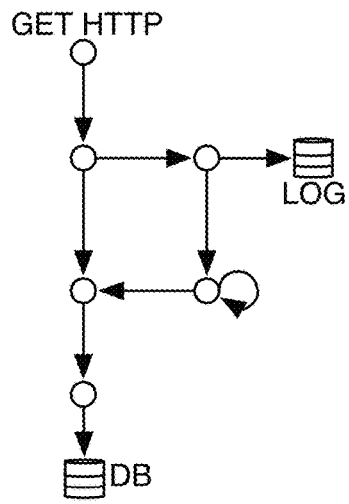
FIGS. 2A-2C is a schematic representation of an exemplary implementation of monitoring execution flow.
Figure 2B:
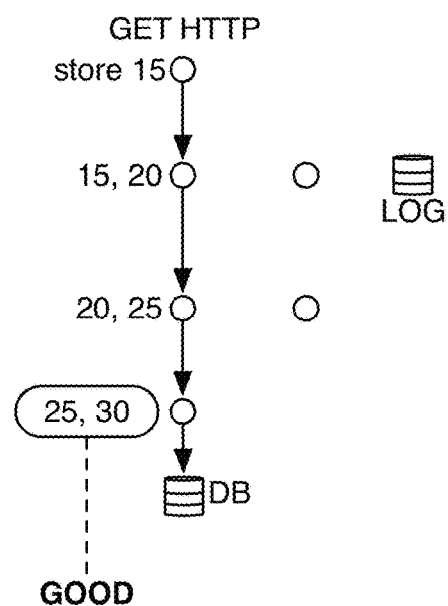
Figure 2C:
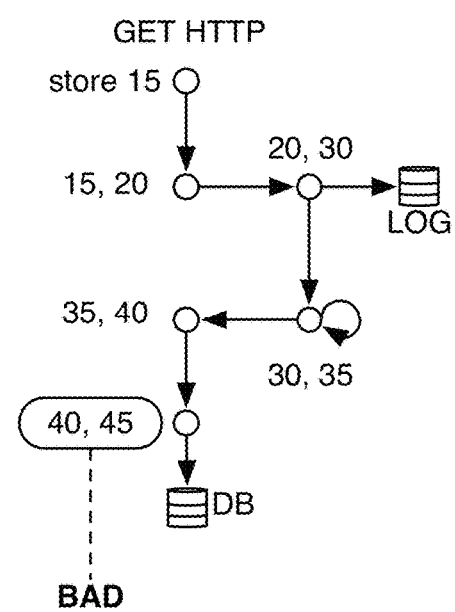

An execution flow of interested may be selected and instrumented such as shown in the exemplary execution flow of method calls shown in FIG. 2A. A flow counter may be compared and incremented based on the flow of execution control, which may result in a counter ending on different values depending on the particular path. As shown in FIGS. 2B and 2C, the counter comparison and selective incrementing can result in different flow counter values depending on the control flow path. The counter will undergo different counter increments depending on the path so that "good" and "bad" paths can be detected. In the case of a "bad" path (i.e., execution flow satisfying a sequence condition associated with a security event), a security event can be triggered and a corresponding response taken. This may be used to detect execution flows that may expose vulnerabilities such as logging sensitive data shown in FIG. 2C.

Instrumenting the application with a runtime agent S120 may further include instrumenting for multiple users. Instrumenting for multiple users functions to create a runtime environment wherein the runtime agent is integrated into the application identically. Instrumenting for multiple users may reduce overhead by requiring only one implementation of method S120 for all users. Additionally, instrumenting for multiple users may enable complementary updates to the security and allow multiple users to work together in monitoring and improving the security of the application.

Block S130, Enforcing the runtime agent on the execution of the application may function to enable the operation of the runtime agent within the application during application execution. As mentioned before, there may be various modes of operation by a runtime agent that may or may not operate simultaneously depending on the use case. These modes may include but are not limited to: monitoring the execution flow S132, detecting potential security threats S134, and regulating the execution flow S136. Enforcing the runtime agent preferably detects occurrence and/or tracks properties relating to security events. Detection and tracking are preferably enabled through the instrumentation of block S120. Enforcing the runtime agent on the execution of the application S130 may be implemented with each individual execution of an application or may be turned on or off as desired. Enforcing the runtime agent on the execution of the application S130 may function in accordance to the code profile and the corresponding instrumentation of the application code. Thus, enforcing the runtime agent on the execution of the application S130 may function differently and dependent on implemented code profile.

Block S132, monitoring the execution flow, is preferably a component of enforcing the runtime agent on the execution of the application S130. Monitoring the flow S132 functions to track and analyze the utilization of the set of controls during execution of the application. Monitoring the execution flow S132 may allow the runtime agent to collect metrics in an agnostic manner as to the good/bad nature of the occurrence. In the preferred variation, wherein the set of controls include input/output calls, data type activity calls, and method calls; monitoring the flow S130 preferably includes tracking and analyzing: input/output calls, input and output data (i.e. payloads) associated with the input/output calls, activity with various types of data, and function calls.

Monitoring the flow S132 may include reporting executing flow, which can enable a security operation team to inspect activity of the application based on how the application is structured. Execution flow and corresponding data such as input/output calls, input and output data, function calls and the like can be logged and reported within a user interface for analysis and inspection by a user or some computing system. The code profile is preferably used in extracting and understanding of the application so that activity can be segmented and classified according to the structure of the code. Segmenting and classifying according to the structure of the code may further enable tracing security vulnerabilities to specific controls and thereby specific lines of source code. For example, input activity like requests made to different paths on an HTTP port can be tracked as distinct metrics. As another example, output activity like DB operations made for various data types (e.g., sensitive data) can be tracked.

Segmenting and classifying according to the structure of the code may further enable distinguishing and tracing input data. Monitoring the execution flow S132 preferably includes segmenting and classifying payloads and monitoring the interaction with source data type and input calls. By monitoring these interactions, the runtime agent may identify additional security vulnerabilities that are unique to a payload and data type interaction. For example, the runtime agent may identify a potential payload attack vector due to the size of payload being beyond the bounds of the input call variable. In some variations, payload classification can be used in combination with other control sequence pattern detection to provide more robust and efficient payload analysis. In this way, the runtime agent can perform targeted payload analysis that performs regular expression analysis or other forms of data payload analysis in situations that satisfy an initial security event condition. In the event where execution flow is considered safe flow (e.g., not flagged or not satisfying some condition), then payload analysis may be omitted (potentially beneficial to performance). In the event where execution flow is considered a potentially unsafe flow, then payload analysis may be triggered and based on that a second or more serious security event may be triggered. This functions to perform payload analysis in portions of code where it may cause harm.

Additionally, a user or outside system may define a new security event condition, which may update a security profile dictionary or other suitable resource used in responding to detectable events of the runtime agent.

In the preferred variation, wherein the set of controls includes data type activity, monitoring the execution flow S132 includes monitoring data type activity. Monitoring data type activity functions to track and detect activity associated with various types of data, and thus enable security warnings due to mishandling of sensitive data. Monitoring data type activity is preferably applied to tracking sensitive data such as PII, financial data, passwords, security keys, secrets, health data, and/or other suitable types of sensitive data. Monitoring datatype activity preferably involves structuring monitoring for hierarchical inspection. The runtime agent may track sensitive data activity so that an administrator can query different data types, portions of an application, and/or other scopes. For example, in monitoring datatype activity, block S132 may be enabled to expose a search interface wherein a user could search for "passwords" to see how passwords are handled within the application.

Monitoring the execution flow S132 may additionally or alternatively include extracting general activity information from operation of the application. The activity information may be used in providing further security insights into the operation of the application and lead to more advanced iterations of the code profile that are more secure or lead to different use cases of the runtime agent. Additionally, general activity information may allow insight into better optimizing the application.

Block S134, detecting a security event is preferably a component of enforcing the runtime agent on the execution of the application S130. Detecting a security event S134 functions to determine a potential security threat, vulnerability, or other type of concerning condition within the application. Detecting a security event S134 may comprise of the runtime agent identifying and flagging a section of the execution flow as a potential security threat.

Detecting a security event S134 may be based on interpretations of the code profile. Depending on the code profile implementation, the code profile may have classifying actions and/or collections of actions (section of execution flow) that define potential security threats. Such potential security threats may be selected for targeted instrumentation in block S120. Alternatively, security events may be detected through general instrumentation of application code. Detecting a security event S134 may detect different and distinct potential security threats dependent on these distinct code profile implementations.

Detecting a security event S134 may take a more application execution approach. In understanding the design of the application code, more nuanced security events can be detected than approaches that lack an awareness of the underlying design of an application. Such targeted detection may particularly utilize tracing of the execution flow. Execution flow may be manifested in tracking sequence of method calls. A particular sequence pattern of method calls may be monitored condition used to detect a security event. Such sequence patterns may include direct sequential method call patterns. Sequence patterns may additionally include patterns characterizing loops and iterations. Detecting a security event S134 may identify a security event by tracing through the execution flow and identifying where data is used. In one example, user data can be traced through the code profile and used to detect user data being used in MySQL output, identifying a potential security threat Detecting a security event S134 may occur if sensitive data is mishandled. Monitoring of sensitive data may enable detecting a security event S134, such as detecting sensitive data being handled by, being communicated to, or otherwise interacting with an insecure output. For example, detecting sensitive data being stored in a public log or an unencrypted format may lead to detecting a security event S134. Misuse may include lapses in handling of the data (e.g., communicating in an unencrypted format), communicating to a third party, not sanitizing user-supplied data before processing, or other forms of misuse.

In preferred variations detecting a security event S134 may identify a security event by "looking up" sections of the execution flow in a security profile dictionary. The security profile dictionary may function as a repository of vulnerabilities. In preferred variations, the security profile dictionary includes vulnerabilities, their known exploits (i.e. security threats), and prescribed directions to counter the known exploits. The security profile dictionary may be application specific and/or a general vulnerability repository. In some variations, a library specific security profile dictionary is maintained and implemented for sections of the execution flow. An application may have multiple security profile dictionaries that may or may not overlap. For example, an application may have an application specific security profile dictionary of its own and also multiple security profile dictionaries for implemented libraries. An application may also have distinct security profile dictionaries for different use cases. For example, one security profile dictionary may be implemented during software development that focuses on function call threats and includes prescribed directions that are heavily weighted towards giving user feedback, while another security profile dictionary is implemented during regular application use that focuses on data input and automated security responses with minimal user feedback.

The method may additionally include updating a security profile dictionary. Updating a security profile dictionary may be performed automatically or semi-automatically through monitoring execution of the application code (e.g., code interpretation or binary execution). Alternatively, a user like a security ops developer may update the security profile dictionary. For example, after observing the occurrence of a particular security event, the responding action to that event occurrence can be updated to change how it's handled.

Block S136, regulating the execution flow is preferably a component of enforcing the runtime agent on execution of the application S130. Regulating the execution flow S136 functions to enforce rules on the execution flow of the application during runtime. Regulating the execution flow S136 enables the runtime agent to take actions to mitigate and/or prevent vulnerabilities. In particular, a runtime agent may specifically restrict operations performed on behalf of the code profile and/or security profile dictionary. These restricted operations are preferably based on the security threat exposure as indicated by the code profile and/or the security profile dictionary, but may be based on application optimization or administrator testing.

Regulating the execution flow S136 may include following prescribed rules of the security dictionary. Certain execution flows may be black-listed within the security profile dictionary. Regulating the execution flow S136 may block the application from following black-listed execution, forcing the application to take a different execution path. Black-listed sections of execution flows may correspond to known security vulnerabilities. Alternatively, black-listed execution flows may be implemented in regulating the execution flow S136 for testing or other purposes. In some examples, specific execution flows may be black-listed to prevent behavior that the application was never intended to perform. For example, forking a process can be dangerous, and so enforcing the runtime agent on the execution of the application S130 may identify the forking behavior, by monitoring the flow S132, and proactively prevent such use, by regulating the execution flow S136.

Regulating the execution flow S136 by black-listing and white-listing of execution flows may be implemented in the security profile dictionary as described previously, but may additionally and/or alternatively be implemented as part of the code profile. Black-listing is used herein to characterize prohibiting defined execution flows. White-listing is used herein to characterize explicit permitting of defined execution flows. In one variation, the black-listing of methods or particular sequence patterns of methods may be set by default, and the code profile may be used to identify potential method calls that an application administrator may want to enable. The administrator could be alerted and prompted to customize the blacklist and/or whitelist if desired.

As described above, the code profile may have portions that include a set of assumed possible implementations. Regulating the execution flow S136 may additionally include validating assumed implementations, which functions to disambiguate and/or confirm the guesses or predictions that reflect the actual execution of the application. In this way, aspects of the application that are unclear through code analysis can be made more precise by being combined with runtime analysis. In one variation, execution flow tracking may be used to validate predictions of the code profile. For example, the execution of the runtime agent may enable the actual implementation of a set of possible implementations to be detected. Other techniques can similarly be used in checking the assumptions of the code profile.

Block S140, responding to the runtime agent may function in reacting to the actions of the runtime agent and optionally enabling user input. Responding to the runtime agent S140 includes responding to the security event S142, of any potential security threats determined by detecting a security event S134, and optionally providing a user interface S144. Responding to the runtime agent S140 may be implementation specific. For example, responding to the runtime agent S140 may be dependent on the set of controls set in the code profile, dependent on the security profile library implemented (if any), and/or specifically implemented administrator rules.

Responding to the security event S142 may function in characterizing the threat potential of the security event and ameliorating characterized security events. Characterizing the security event may include determining the severity of threat (e.g. general warning, unknown threat, extreme threat, etc.) and the type of security event (e.g. exposed data, harmful data injection, unstable process, etc.). Ameliorating the security event may then include following prescribed procedures for the characterized security event and/or reporting the security event. A subset of prescribed procedures, which may include all prescribed procedures, are preferably available in a security profile dictionary. Additionally and/or alternatively, a subset of prescribed procedures may be implemented in the code profile and/or implemented by an administrator.

The security profile dictionary may define or characterize known potential security threats and prescribed procedures to respond to corresponding security events. Thus, responding to the security event S142 may include following a defined security profile dictionary response to the identified security event. A variety of types of responses may be used. Exemplary types of responses can include logging occurrence of the security event, actively blocking execution flow, actively allowing execution flow, altering execution flow (e.g., softly failing and issuing a warning or error), updating security settings (e.g., updating a firewall setting), augmenting a data payload (e.g., sanitizing data payload), and/or taking suitable action.

In preferred variations, responding to the security event S142 further includes updating the security profile dictionary by adding newly discovered security events and updating data on previously known security events. Adding and/or updating security events may include, but not limited to: adding new sections of harmful execution flow, black-listing or white-listing execution flows, upgrading or downgrading the threat levels of a specific security event, identifying a specific type and/or size of a harmful payload, and adding known dangerous payload injections, and increasing/reducing the verbosity or the number of warnings given for a commonly observed mild threat. The security profile dictionary may be updated automatically and/or may be updated by an administrator. If the method has sufficient information, the responding to the security event S142 may automatically make the necessary updates. For example, responding to the security event S142 may automatically update general security metrics within the security profile dictionary and may black-list a section of execution flow which includes a sensitive data type and unencrypted handling of that data.

As described previously, responding to the security event S142 may enable regulating flows S136 by white-listing and/or black-listing sections of the execution flow. In some variations, white-listing and black-listing may not initially be implemented, but are implemented over runtime iterations. One example of this would be sending sensitive data. The initial base code may just designate sending the sensitive data to a specific location without implementing a specific transfer protocol. Once detecting a security event S134 has observed sensitive data sent over an insecure protocol (i.e. identified the section of execution flow corresponding to the sensitive data and the insecure transfer protocol), responding to the security event S142 may update the security profile dictionary by black-listing the section of execution flow that contains the sensitive data call and the just implemented insecure transfer protocol. The security profile dictionary may in this manner be updated iteratively each time an insecure transfer protocol is implemented with that sensitive data call until the sensitive data is only sent over a secure transfer protocol. Alternatively, the security profile dictionary may white-list a specific execution flow (or a set of execution flows) that contains the sensitive data and a specific secure transfer protocol thereby ensuring the sensitive data is always transferred using that specific secure transfer protocol.

In the example where a security event was identified by tracing user data to a MySQL output, responding to the security event S142 may initially include identifying the data and communicating the data to an administrator, who may then assign handling of such behavior or take other corrective actions (e.g., updating the application code). Responding to the security event S142 may additionally include proactively preventing vulnerabilities. For example, an error or other corrective action may be injected into the attempted use of user data in a MySQL output as described above to prevent such an event.

As an additional or alternative variation, responding to the security event may include modifying firewall settings based on clients involved in the security event. Accordingly, executing a runtime agent can include collecting source IP of a client device associated with the security event and submitting the IP to a network firewall. This functions to proactively block bad actors involved in suspected bad behavior. The network firewall could be a third party outside entity. Alternatively, a firewall may be operated in direct connection to the method. Preferably, the IP or other identifying parameters of involved clients/devices (i.e., sources) can be recorded for security events. Within this log of sources, a pattern in the sources can be detected within the security events. This pattern may include a condition of one particular IP source being involved in more than a threshold of security events within some time window. Other patterns may detect regional attacks or other suitable patterns.

Figure 3A:
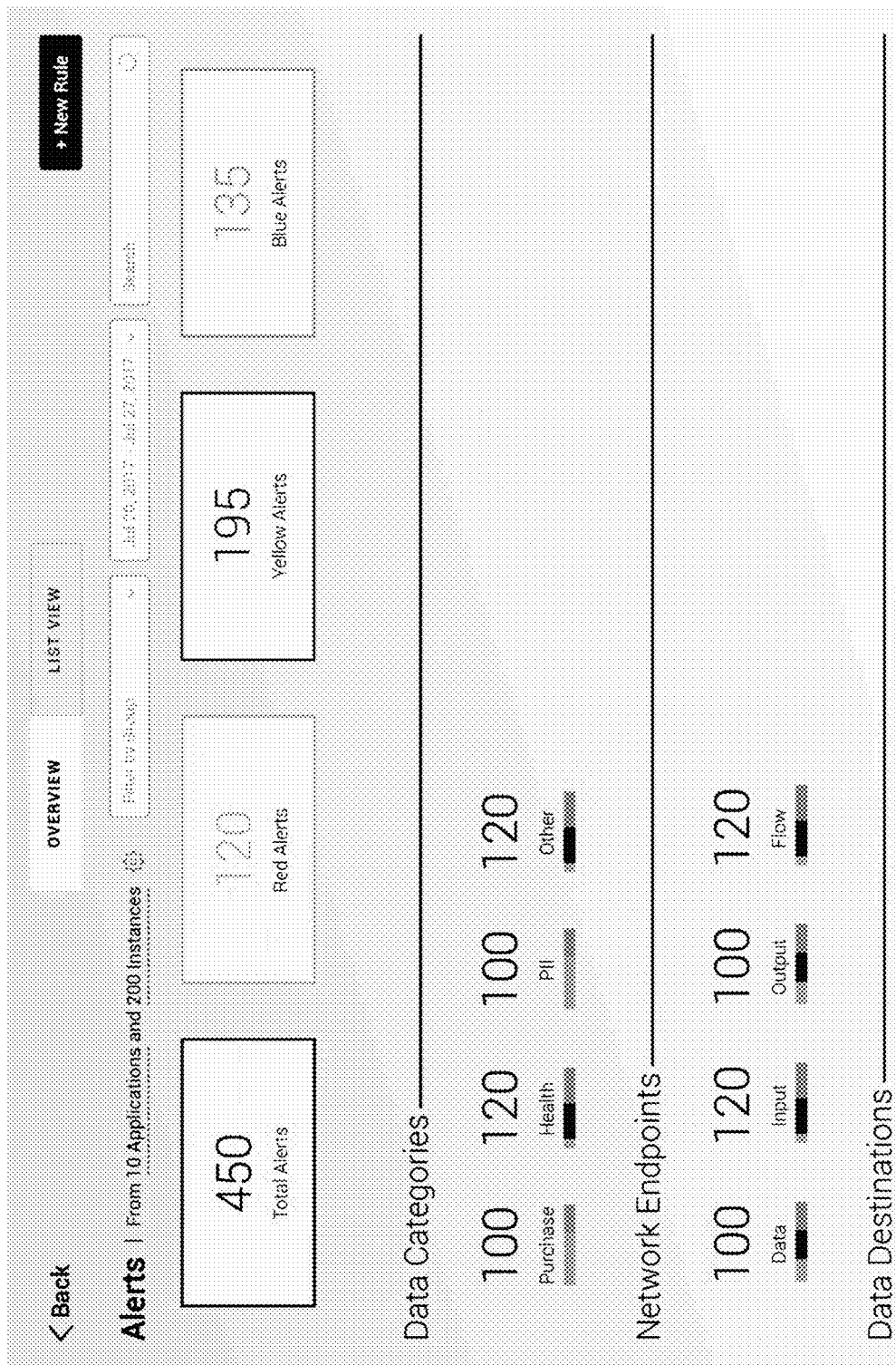
FIGS. 3A-3F are exemplary screenshot representations of dashboard views.
Figure 3B:
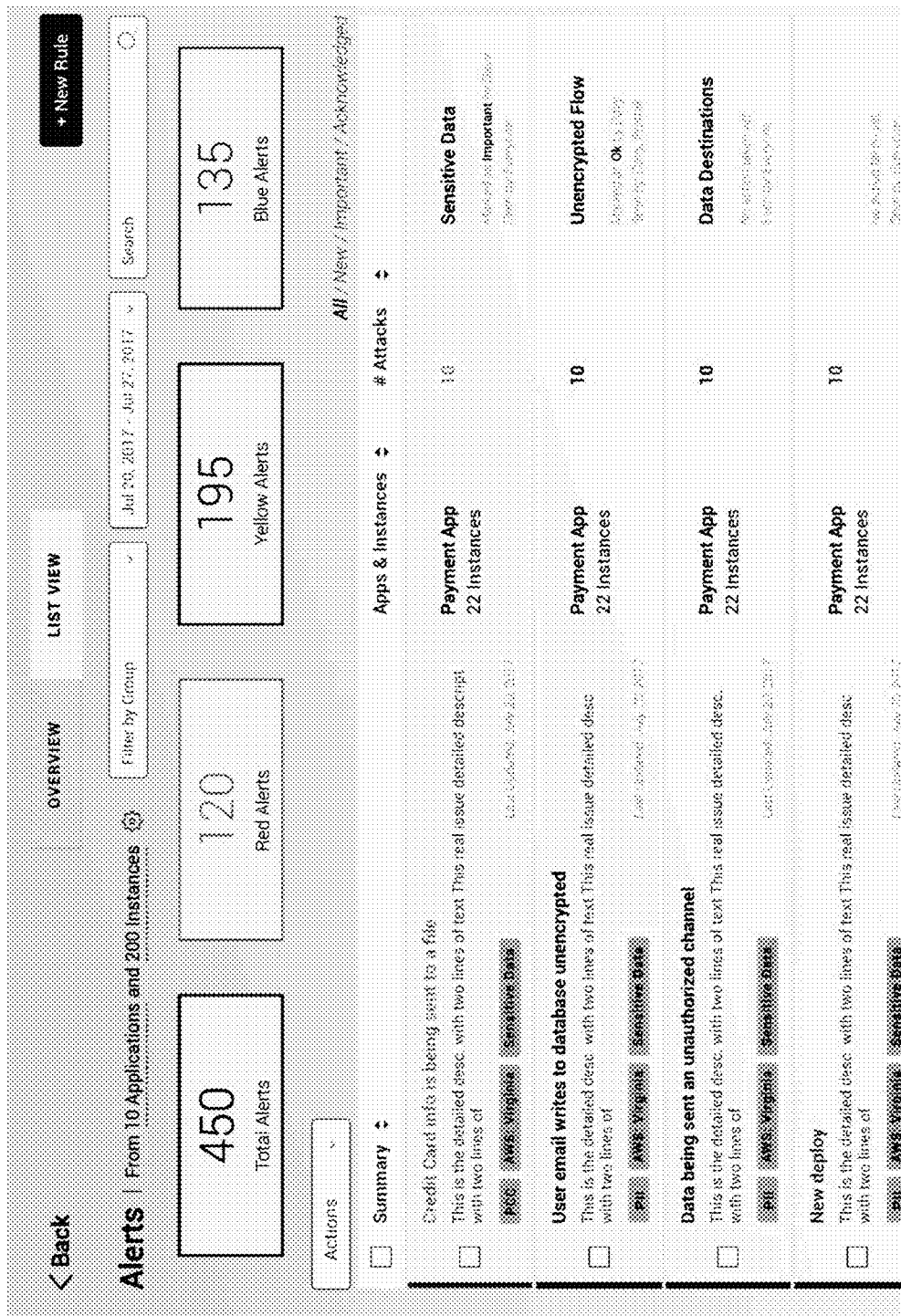
Figure 3C:
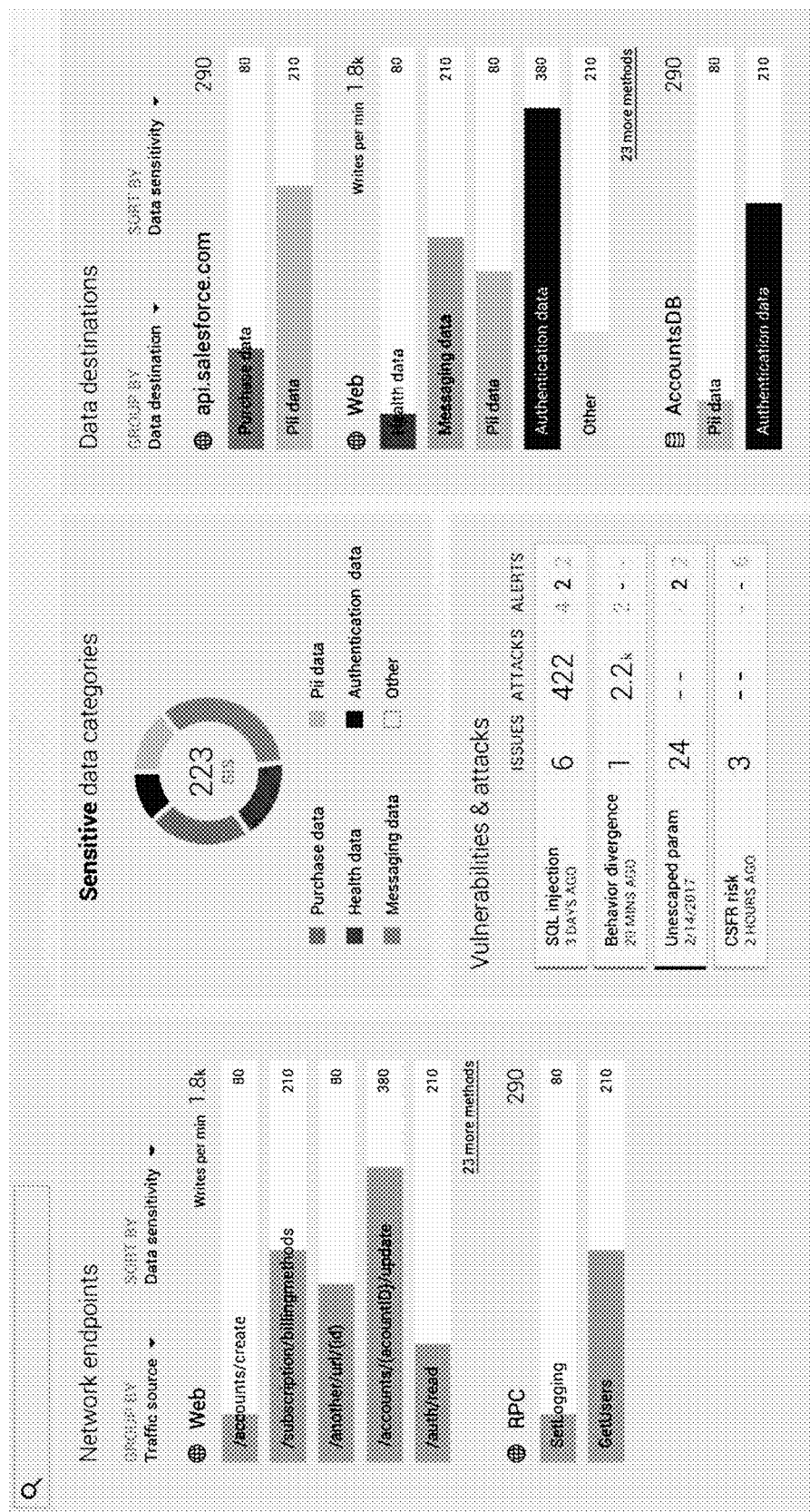
Figure 3D:
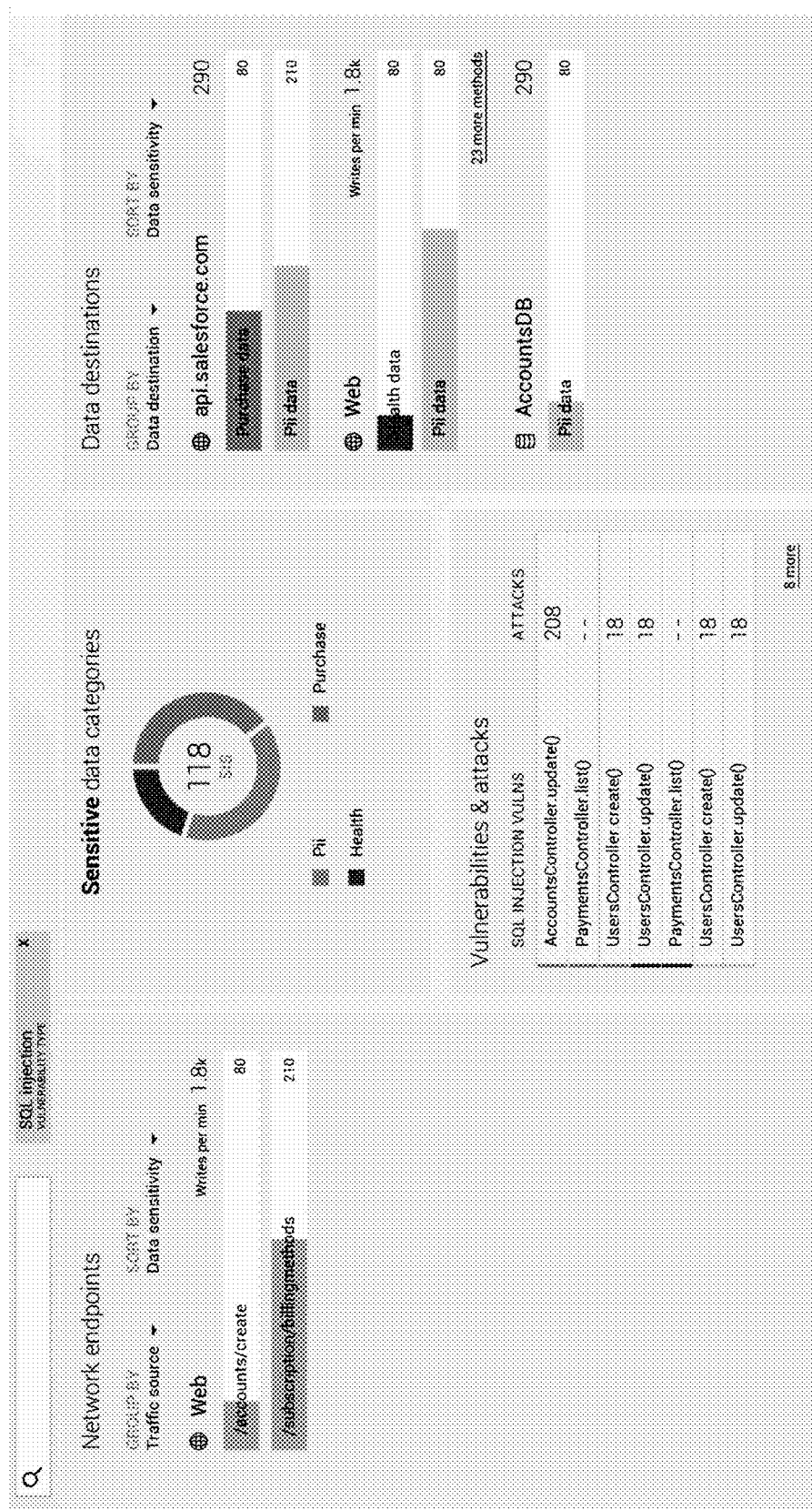
Figure 3E:
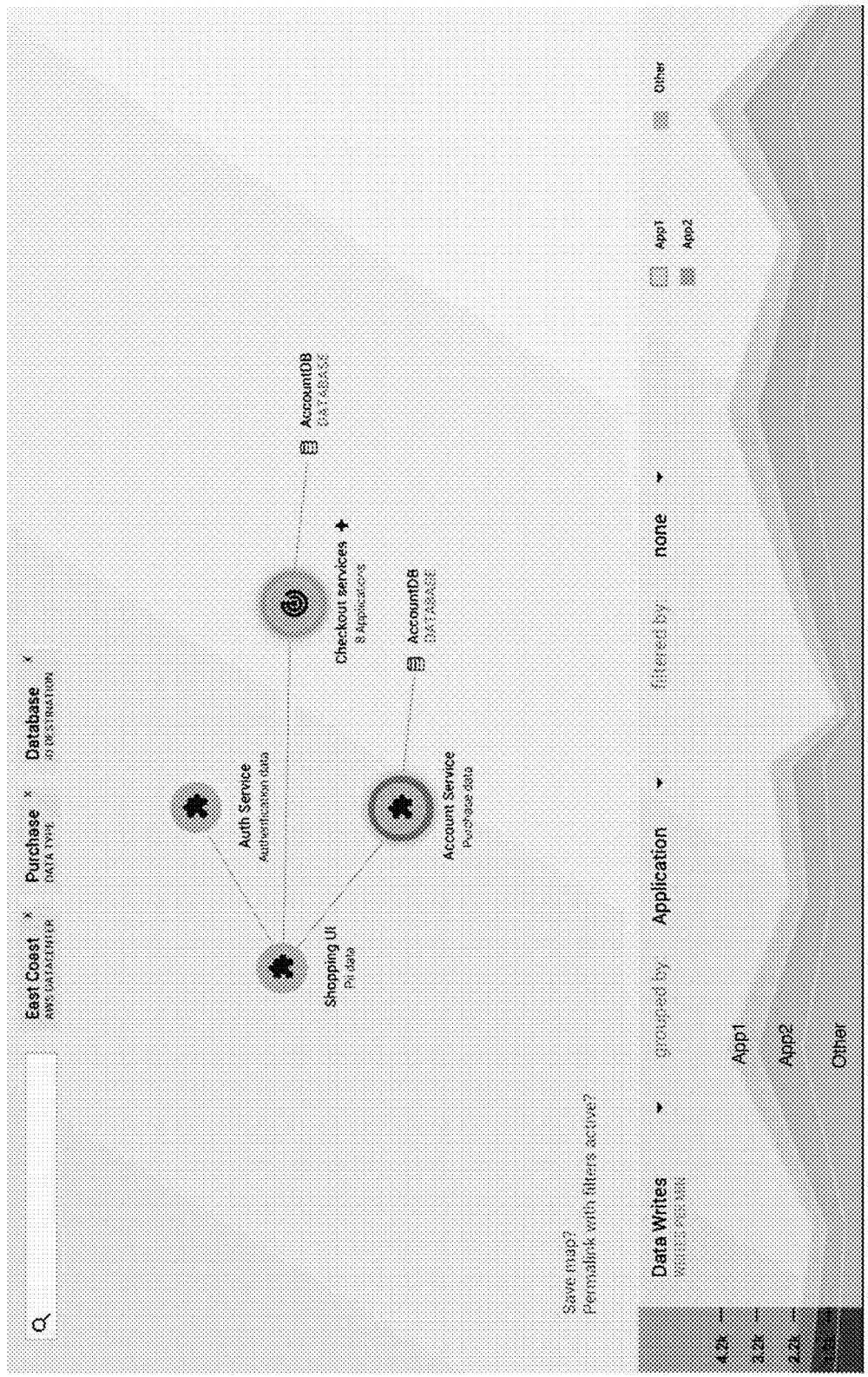
Figure 3F:

Block S144, which includes providing an interface, may be a component of responding to the runtime agent S140. Providing a user interface, functions to enable access to runtime activity for review of application code execution and/or managing execution of application code via the runtime agent. Providing an interface S144 preferably includes providing a graphical user interface. The graphical user interface can be a dashboard accessible through a web application and/or a native application. The dashboard may show various forms of metrics. In one variation, responding to the runtime agent can include identifying involved controls within the set of code sources and reporting the involved controls through the user interface In another exemplary implementation, the dashboard may breakdown input activity, output activity, activity for various data types, and/or alerts as shown in FIGS. 3A-3C. Information around the performance and security of an application can be inspected. The dashboard is preferably interactive and can enable querying and customized reporting on various metrics as shown in FIGS. 3D and 3E. For example, an administrator may be enabled to search for a particular data type and inspect how that data type has been handled in the context of the application codebase. The types of activity information may additionally be shown in different views. As shown in FIG. 3E, purchase data involving a particular data center and database destination can be viewed from an application service level. Various alerts or insights can additionally be presented to an administrator as shown in FIG. 3F, which functions to increase awareness.

Providing an interface may additionally or alternatively include providing a notification interface, an API, and/or an eventing engine. An API such as a REST API or GraphQL API can enable programmatic integration. The eventing engine can provide a mechanism so that different events or actions can be triggered in response to different conditions. The notification interface can enable notifications, alerts, or communications to be triggered in response to activity of the application based on execution of the runtime agent. These responses may include all information regarding the code profile and all information gathered by the runtime agent. In addition to the actual code profile, information about the code profile may include, but is not limited to: control parameters, update history of the code profile, and user comments. Gathered information from the runtime agent may include, but is not limited to: the traveled execution flow, observed security events, security event responses (e.g. execution flows were circumvented, payload data blocked), list of security events that have had a response, list of security events that have not been responded to, and security event action recommendations. Alternatively, the user may set filters to reduce or focus the information received.

The dashboard and/or other interface may additionally enable management of the runtime agent. An administrator may be enabled to update configuration that defines how the runtime agent augments operation. For example, an administrator may be black-list or white-list one, or a set of, execution flows. The administrator may additionally change or update the security profile library.

System

Figure 4:
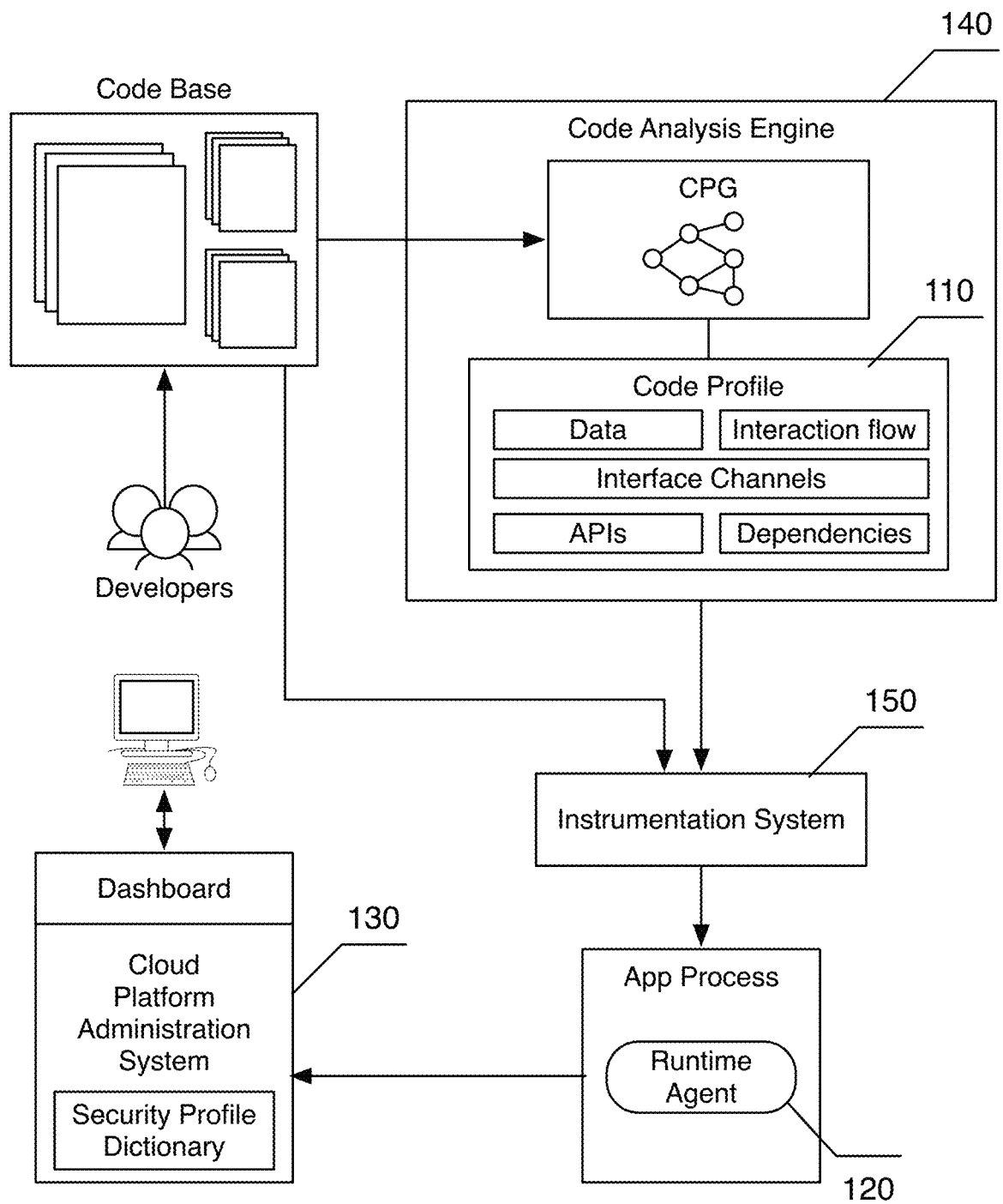
FIG. 4 is a schematic representation of an implementation of a system of a preferred embodiment.

As shown in FIG. 4, a system for securing applications through an application-aware runtime agent of a preferred embodiment can include a code profile 110 generated from an application, a runtime agent system 120, and an administration system 130. The code profile is preferably generated using a code analysis engine 140. The runtime agent system 120 is preferably integrated with application code through an instrumentation system 150. The system preferably implements the method described above. A preferred implementation of the system offers application monitoring as a service to different applications. This implementation can include an account system and/or other supplementary components to facilitate offering of the system as a cloud hosted platform. Alternative implementations may provide the system as a single-instance variation that is designed for integration with a single application.

The code analysis engine 140 functions to generate a code profile 110 from source code or a subset of the source code. The code analysis engine 140 may alternatively convert a subset of one or more source codes (referred to as base code) into a code profile 110. As many applications rely on libraries and open source software, the code analysis engine 140 can facilitate generation of a code profile 110 that can account for security impact of third party code bases. For example, the code analysis engine 140 could assess the code bases of various open source libraries and a main project.

The code profile 110 is preferably a code property graph (CPG) as described above. The code profile 110 may alternatively be any suitable model of the code based on the application code (more specifically, the development/production application code). In some alternative implementations, the system may not include a code analysis engine 140 and instead the code profile 110 is retrieved or produced through alternative mechanisms.

In one preferred implementation, the code analysis engine 140 preferably includes a first code analysis tool that extracts the CPG. The CPG represents operational relationships such that execution and data flow can be traced through the base code and its constituent frameworks and libraries (i.e. dependencies). The CPG can be used to characterize potential vulnerabilities. The code analysis engine 140 preferably includes a second code analysis tool that traverses the CPG and generates a code profile 110 using the relationships and execution and data flows within the CPG.

The code property graph of a preferred embodiment is a joint data structure, or model, which may be composed of an abstract syntax tree (AST) subcomponent, a control flow graph (CFG) subcomponent, and a data flow graph (DFG) subcomponent. The code property graph may alternatively be characterized using any suitable format. The joint data structure CPG may include a node for each subcomponent for each subject and predicate the base code. The CPG preferably enables efficient processing and analysis of the base code by enabling efficient graph traversals. The CPG is preferably a serializable data structure, which can enable efficient generation, transmission, and distribution of the code profile 110 across various machines. Being easily transmitted can enable parallelized processing of the CPG, which can be leveraged in efficient traversal of the CPG in analysis of interaction flows between various points of interest in the codebase. A CPG can additionally be established for different segments and/or dependencies of the code base. For example, CPGs can be extracted from libraries that are called by the code base and/or distinct subcomponents of the code base. Extracting a CPG for these different segments may additionally help focus and identify locations of interest within the code base. For example, a library CPG may help identify a code base variable that has gone out of its valid parameter range.

An AST functions to characterize the structure and syntax of the code. An AST faithfully encodes how statements and expressions are nested to produce programs. A code parser can create an AST as an ordered tree where inner nodes represent operators and leaf nodes match operands.

The CFG functions to characterize the functional flow of execution within the code as well as conditions that need to be met. The control flow graph can preferably represent sequential and/or possible sequences of execution. The CFG is comprised of statement and predicate nodes, which are connected by directed edges to indicate transfer of control. A statement node has one outgoing edge, and a predicate node has two outgoing nodes corresponding to true and false evaluation of the predicate. The CFG preferably characterizes the calls between functions in the code, the conditional branches within the code, and/or other elements of control flow. For example, a statement preceding an if-statement will have an association into the if-statement or over the if-statement within the CFG. The CFG may be used to determine the execution flow in base code.

The DFG functions to show the operations and statements that operate on particular pieces of data. Traversing the edges of the graph can indicate the flow of data. The DFG can additionally capture possible operations.

The AST, CFG, and DFG are preferably combined into a joint data structure as the CPG. The three graphs AST, CFG and DFG each have nodes that exist for each statement and predicate of the source code. The statement and predicate nodes can serve as a connection point of the three graphs when joining to form the CPG. Through the three subcomponents, CPG may contain information about the processed code on different levels of abstraction, from dependencies, to type hierarchies, control flow, data flow, and instruction-level information. Passes over the CPG may allow inspection of the base code structure, control flow, and data dependencies of each node, and thus traversing and/or making queries into the CPG may give better understanding of the code base (e.g. by identifying vulnerability patterns).

The code profile 110 functions as a manifest interpretation of the components of the code, that is to say the application controls, that can have security and functional implications. The code profile 110 may be generated from the CPG. Code analysis and interpretation of the code profile 110 can detect certain parts of the code that have some implication on the data type, handling of data, and interactions with outside systems or code, giving contextual understanding of the base code. An analysis engine may from this select or determine particular security events of interest and/or instrumentation specifications for monitoring of the application code during execution. The code profile 110 can preferably be broken down into a set of components that in combination can encapsulate the attack surface of the code. The code profile 110 could include components broken down by: interface channels, data, interaction flows, dependencies, and/or API elements. Additional or alternative components may additionally be used. For example, the code profile 110 could break down the various interface channels to outside systems, instances of data of interest, the various interaction flows of data to different interface channels, and dependencies on external libraries. Some of the components may be more applicable to certain types of code bases (e.g., libraries vs. web applications).

The code profile 110 may be generated from CPG using the code analysis engine 110. The graph structure of the CPG may convert a code analysis problem into a graph theory problem, potentially reducing the computational power required to solve the problem. That is, because of the graph structure code analysis may be done using parallel processing in clusters and allow for more efficient caching of data. Interface interactions of the code profile 110 may be generated by tracing the flow of interfaces on the CFG component of the CPG. Data interactions of the code profile 110 may be determined tracing the flow of data on the DFG component of the CPG. In some variations, where there is a code policy, the code profile 110 may be generated conjointly from the CPG and the policy. In these variations, the code analysis engine no generates the code profile 110 from the CPG according to the specifications of the security profile. The CPG can be evaluated against the security profile. To this end, the code analysis engine 110 performs static data and flow analysis to determine data and flows in the application that violate or otherwise meet conditions or rules of the security profile. The security profile may be a default profile, a customized security profile, and/or a combination of security profiles. In one variation, a baseline security profile could be used in combination with a customer defined security profile. Parts and/or all of the code policy itself may also be incorporated into the code profile 110.

The code profile 110 may be generated for a particular scope of code, but code profiles 130 could additionally/and or alternatively exist for subcomponents of the base code. Thus a code profile 110 may be generated for an entire base code, or for one or more sections of code (e.g. a code profile 110 for a specific function within the code). Additionally, code profiles 130 may be generated for dependencies of the base code, such as modules, and external libraries that are called on by the base code. Any other variations or alternatives of the base code and/or base code dependencies may also be implemented to generate a code profile 110. Additionally, nested hierarchies of code profiles 130 may also be generated, wherein potentially overlapping code profiles 130 for a subset of the base code and/or a code profile 110 for the entire base code are created. Nested code profiles 130 can enable someone to see, with greater focus, the impact of sections of the base code.

The interface channels function to characterize the input/output associated operations of the codebase. Interface channels may represent every way the base code interacts with the outside world. The interface channels of the code of interest are preferably described within the code profile 110. A codebase (or process) will have at least one interface channel component if the codebase has a statement establishing communication with an outside system. An interface channel component can output data to an outside system and/or receive data from an outside system. An interface channel could be contained directly within the codebase (e.g., a process of the codebase accesses or interacts with a network, database, file, etc.) or indirectly (e.g., a used library or module accesses or interacts with a network, database, file, etc.).

In one implementation, interface channels can be identified by statements that are tagged or detected to perform some action with an outside system. The system may include a library of pre-tagged statements that the code profiler may use. Statements triggering system calls and/or other types of statements could be tagged as such. Generally, an interface channel can be detected by traversing the CFG from system call statements or other tagged statements and incorporated into the code profile 110. For example, an application could be detected to make use of a set of interface channels by tracing associations through libraries and frameworks to underlying system calls.

System calls are functionality exposed by the underlying operating system. There is usually a well-defined way for a language to interact with the underlying operating system. System calls are preferably incorporated into the code profile 110. System calls cannot be accessed directly by user programs, and are generally only accessed by kernel code. For example, the Linux kernel for the x86_64 processor architecture provides over 300 system calls. When a system call is made, there is a transition from user space to kernel space, which runs at a more privileged level. Arguments to the system call are copied into the kernel space and validated to ensure they do not compromise the kernel. However, it is highly likely that the parameters were validated in user space as well. In some cases the user space functions will be thin wrappers over the kernel functions, in other times they'll provide additional features on top.

Instances of interface channel components can have attributes such as a type, read/write mode indication, description, address, method, protocol, data received, data sent, channels received from, channels sent to, and/or other suitable attributes.

The type of interface channel can be classified based on the type of interaction with an outside system. Five preferred types of interface channels can include: network, database, file, commands, and logging. By inspecting the interface channels of a code profile 110, one could see if some type of network access, database access, file, access, and command access is used. The code profile 110 could then break down interface channels of different processes by the type of interface channel. A network interface channel can be indicated by a statement using a webs route, a 3rd party API, reading from or writing to a queue or nearlines storage, and/or any other suitable network interaction. A database interface channel can be indicated by statements that perform interactions with a database. In some implementations, database interface channels may be combined with network interface channels. A file interface channel can be indicated by statements that read or write to a file system. Similarly, file interface channels could be a type of network interface channel (e.g., if a network file system), but can preferably be included as its own type, especially for local file system interactions. A command interface channel can be indicated by statements making commands to a database, to a file system, and/or other suitable types of commands. A logging interface channel can be indicated by statements that write data or generates reports of data, events, communications and/or other aspects in a system.

The data components function to identify particular types of data. The data components called out are preferably data that may have an impact on the attack surface of the code base. Data components will have a number of attributes such as type, template, and name.

The types of data components can include data classifications such as attacker controlled, sensitive data (credit card numbers, SSN, etc.), secrets (e.g. credentials, passwords, etc.), user data, personal identifiable information, user generated data, internal data, public data, and the like. The type of data component can be determined through pattern recognition on the codebase. Preferably, natural language processing can analyze class names, object names, structure names, variable names, runtime value patterns, data validation patterns, comments, documents, and/or other aspects to classify data. A template property can indicate the type of object such as a class, object, structure, variable, or other form of data. Additionally, a data component can include attributes to indicate data flow to an interface channel, from an interface channel, to an interaction flow, or from an interaction flow. A data component could additionally include an attribute indicating if it is protected by authentication/authorization layer and the type or properties of protection (e.g., form based authentication, basic authentication, 2-factor, token based, handling password resets, OAuth & OAuth 2, JWT, password strength policy, session cookie, crypto strength, etc.).

Sensitive data is preferably a data type of interest. Sensitive data may include credit card numbers, pin codes, SSNs, etc. Using natural language processing techniques and a default dictionary of indicative terms, sensitive data types may be identified by their name. Tagging directives may additionally be used to mark data as sensitive.

The interaction flow components function to represent the interaction of the profiled components such as the data and the interface channels. Interaction flows of the base code may be extracted to the code profile graph. Tracing the CFG of the code profile graph may allow tracking the flow of execution and tracing the DFG may allow tracking data, data relationships, and all uses of variables. By traversing the CFG and the DFG the flow data may be incorporated within the code profile 110. Depending on the modeling architecture, the flows can be modeled as independent components or as properties of the data and/or interface channels as was indicated above. An interaction flow can indicate the interaction channels from which data flows or to which data flows.

The dependency components function to represent the library, module, or other codebase dependencies. Dependencies may, additionally or alternatively, include internal dependencies. Dependencies may be incorporated within the code profile 110 from the CPG. Each dependency component may have attributes indicating properties like if its deprecated, classified as insecure or vulnerable, bus factored (high volume of committers added/leaving), unmaintained, license violation, or outdated.

The API components function to represent the exposed programmatic interfaces of the codebase. API components may be generated into the code profile 110 from the CPG. API components can be particularly applicable to a library, code module, or application that may expose programmatic interfaces for interactions by other parties. In a library, this can include the exposed function calls for users of the library.

The code profile 110 can additionally include codebase metadata such as language, type, framework (e.g., web-app or library), lines of code, committers, open issues, pending PRs, test coverage, and/or other properties.

The code profile 110 can additionally include additional or alternative components. In one variation, attributes of the code profile 110 may be abstracted into more user-accessible concepts. These higher-level constructs could be represented in the code profile 110. For example, compliance analysis or other forms of conclusions could be represented in these higher-level components.

The code profile 110 can offer a tangible artifact that is usable in understanding the nature of a base code. The code profile 110 can have a data-oriented representation, which could be accessible for programmatic interactions. The code profile 110 could additionally have a translated graphical representation that reflects properties of the code profile 110 in a way more easily observed by a user. This graphical representation could be presented in a dashboard or other suitable interface.

Figure 5:
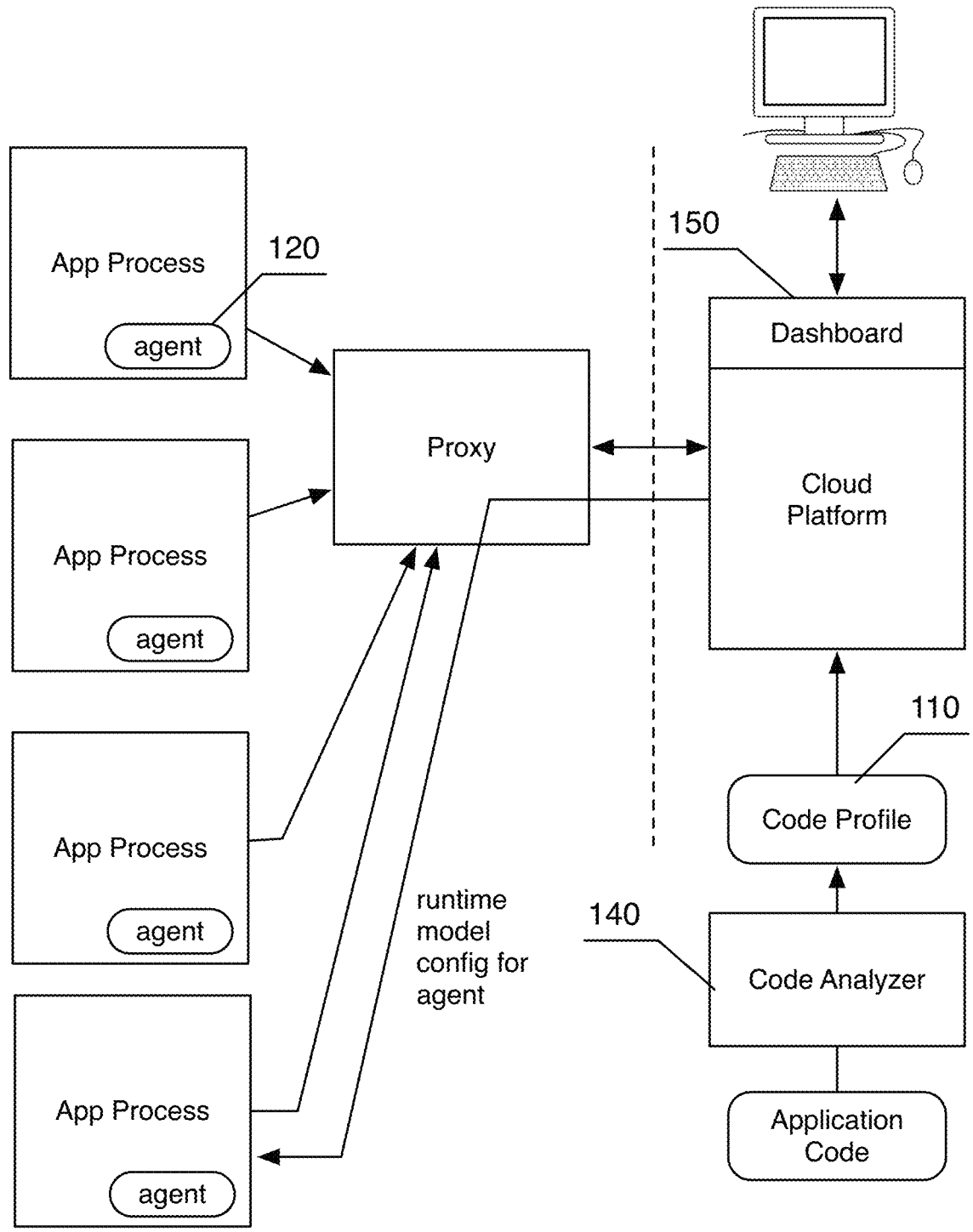
FIG. 5 is a schematic representation of a multi-instance variation of the system.

The runtime agent system 120 functions to integrate with the operation of the application. The runtime agent system 120 collects data and in some variations may augment operation. The runtime agent is preferably deployed along with the application process that is the result of compiling and running the source code. The runtime can preferably enforce policy that is customized to the code profile 110 of the codebase. The runtime agent may additionally use the code profile 110 to take and draw conclusions about the system to facilitate runtime monitoring without inordinate amounts of time building a model. As shown in FIG. 5, multiple application processes or instances may have individual agents that callback to a monitoring proxy. The monitoring proxy collects process information and then communicates with a remote cloud platform. A runtime agent instance may alternatively directly communicate with a remote platform.

The runtime agent system 120 is preferably enabled through an instrumentation system 150 that acts to instrument application code or an executable originating from application code. The instrumentation system 150 may include or coordinate with a compiler so as to augment the execution of the application to trigger or call out to tracking operations. In one implementation, the runtime agent functions to log and record the occurrence of different control-related events. A monitoring service may monitor the control records to detect particular scenarios and thereby triggering various security events.

The administration system 130 functions to provide one or more interfaces to the collected activity and interpretation of the activity. The administration system 130 is preferably hosted in a remote cloud platform, but may be implemented as a local service or application. As described above, the administration system may include various types of interfaces such as a dashboard, a notification interface, an API, an eventing engine. The administration system 130 may be used for accessing or reviewing status of execution of the application as reported by the runtime agent. The administration system may additionally or alternatively be used in managing or controlling aspects of the runtime agent such as configuring a security profile dictionary or other parameters of agent operation.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for securing an application through an application-aware runtime agent comprising:
   acquiring a code profile, wherein acquiring the code profile, which comprises converting a set of code sources of the application to the code profile as a set of flow graphs that includes at least a data flow graph and a control flow graph and that characterizes controls within the set of code sources;
   analyzing the code profile and mapping controls of interest within the code profile by identifying sequences of controls in the set of flow graphs that are associated with detection of a potential security event;
   instrumenting the application with a runtime agent according to the code profile, wherein instrumenting comprises augmenting the execution of the controls of interest in the application to trigger tracking operations during execution of the application;
   enforcing the runtime agent on the execution of the application comprising:
      through execution of triggered tracking operations, tracking execution flow of at least the controls of interest, and
      detecting a security event based at least in part on a detected sequence of execution flow associated with the security event, which comprises identifying a section of the execution flow as the security event; and
   responding to the security event.

2. The method of claim 1, wherein the controls of interest comprise method calls, datatype activity calls, user defined vulnerabilities, and input and output calls.

3. The method of claim 1, wherein monitoring the execution flow further comprises of monitoring data input during the execution of the application.

4. The method of claim 3, wherein responding to the security event further comprises segmenting and classifying a data payload of the execution flow and monitoring the interaction with source data type and input calls.

5. The method of claim 1, wherein the runtime agent is language agnostic, thereby executable in multiple programming languages.

6. The method of claim 1, wherein identifying a section of the execution flow as the security event further comprises looking up the section of the execution flow in a security profile dictionary; and wherein responding to the security event further comprises updating the security profile dictionary.

7. The method of claim 1, wherein responding to the security event comprises as part of enforcing the runtime agent, proactively regulating the execution flow and preventing sequential utilization of controls associated with the security event.

8. The method of claim 1, wherein responding to the security event comprises reactively regulating the execution flow and preventing sequential utilization of controls associated with the security event.

9. The method of claim 1, wherein responding to the security event comprises of identifying involved controls within the set of code sources and reporting the involved controls through a user interface.

10. The method of claim 1, wherein responding to the security event comprises of showing portions of the set of code sources that led to detecting the security event.

11. The method of claim 1, wherein responding to the security event comprises blocking execution flow associated with the security event.

12. The method of claim 1, where responding to the security event comprises modifying firewall settings based on clients involved in the security event.

13. The method of claim 1, where responding to the security event includes generating a security event notification.

14. The method of claim 1, wherein identifying a section of the execution flow as a security event comprises identifying a section of the execution flow defined within a security profile dictionary; and wherein responding to the security event comprises selectively performing at least one of the following:
- locating the application controls and external inputs that led to detecting the security event,
- preventing sequential utilization of controls associated with the security event,
- sending an alert regarding the security event, and
- providing a user interface that outputs runtime agent diagnostics and security event alerts and enables user control of the runtime agent.

15. The method of claim 1, wherein augmenting the execution of the controls of interest in the application to trigger tracking operations further comprises augmenting execution of controls to increment a counter conditional on the execution flow between controls of interest, wherein the counter increments differently depending on if the execution flow satisfies a sequence condition associated with a security event.

16. The method of claim 15, wherein augmenting the execution of the controls of interest in the application comprises inserting atomic compare and swap instructions at the controls of interest to conditionally increment the counter based on sequence of execution path through instrumented controls.

17. The method of claim 15, wherein augmenting the execution of the controls of interest in the application comprises inserting jump statements into method calls of the controls of interest, wherein the jump statements conditionally increment the counter based on sequence of execution path through instrumented controls.

18. The method of claim 1, wherein augmenting the execution of the controls of interest in the application comprises compiling the set of source codes to add the tracking operations to controls of interest.

19. The method of claim 1, wherein detecting the security event is further based upon, if a sequence of execution flow is associated with a security event, analyzing data payload and detecting the security even based on payload analysis.

\* \* \* \* \*